Oct. 23, 1962     F. S. ALLINQUANT     3,059,917
PISTONS FOR VEHICLE OLEO-PNEUMATIC SUSPENSION UNITS
Filed Jan. 30, 1961
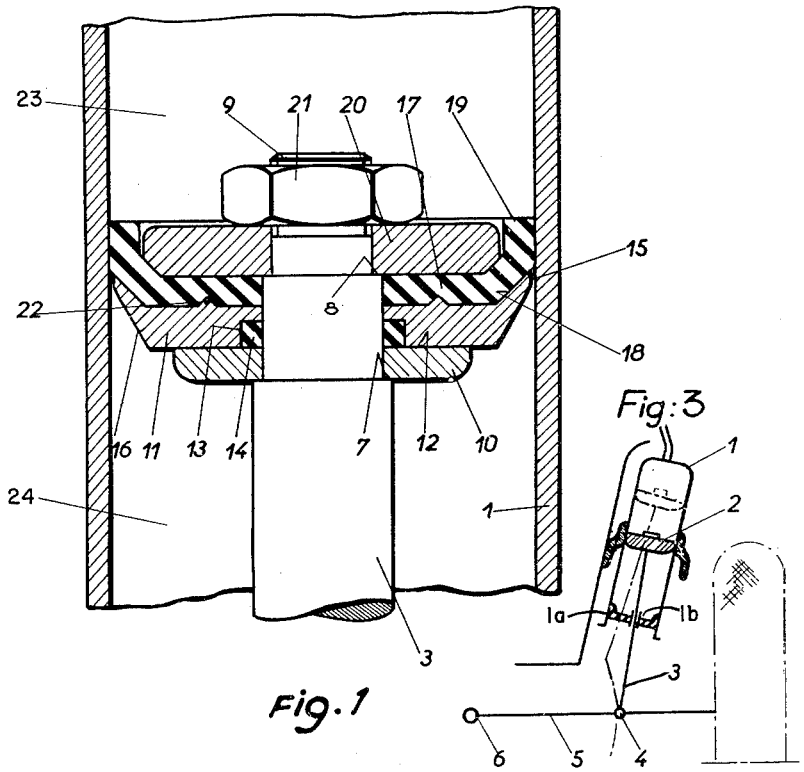
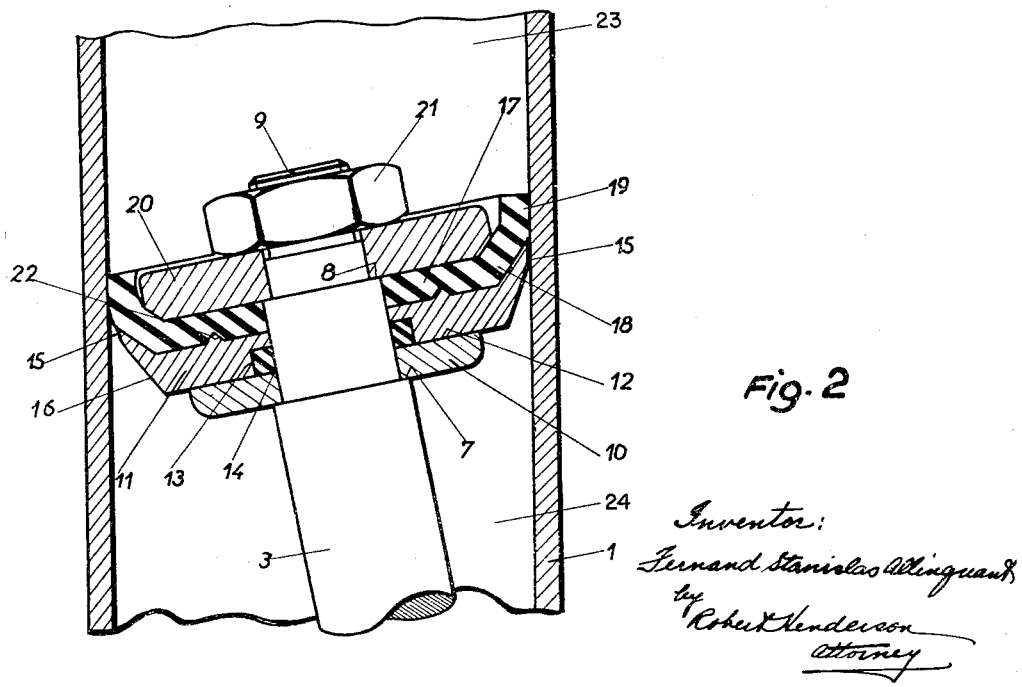

United States Patent Office 3,059,917
Patented Oct. 23, 1962

3,059,917
PISTONS FOR VEHICLE OLEO-PNEUMATIC SUSPENSION UNITS
Fernand Stanislas Allinquant, 53 Ave. Le Notre, Sceaux, France
Filed Jan. 30, 1961, Ser. No. 85,776
Claims priority, application France Feb. 8, 1960
3 Claims. (Cl. 267—15)

The present invention has for its object a piston, and in particular a piston for use in oleo-pneumatic suspension units, carried by a rod capable of oscillating relative to the axis of the cylinder in which the piston slides.

Thus in automobile oleo-pneumatic suspension units, the piston rod is hinged onto a half-axle carrying one of the wheels of the vehicle, while the cylinder is connected to the latter's chassis. As the position of the wheel relative to the chassis varies, the half-axle swings and causes the piston-rod to oscillate in relation to the suspension unit cylinder axis.

To permit such oscillation of the piston-rod it is common practice to hinge the latter onto the piston. In general, the cylinder capacity beneath the piston is occupied by air at atmospheric pressure while the capacity above the piston is occupied by a fluid at relatively high pressure. Since the pressure above the piston is exerted in a direction normal to the upper face of the piston it will be appreciated that when the piston-rod is no longer parallel to the cylinder axis, i.e. no longer at right angles to the upper face of the piston, a couple is set up which produces a sideways-acting mechanical force tending to increase piston wear.

It is the object of my invention to provide a piston which notably enables this drawback to be overcome.

In accordance with the invention, the portion of the piston in sliding contact with the cylinder consists of an elastic washer carried by the piston-rod and whose relaxed diameter is greater than the cylinder bore diameter in order to form, in contact with the cylinder wall, a seal having a lip directed towards the capacity wherein prevails the higher pressure. This washer is pressed against a cup-shaped piece carried by the rod on the side of the piston where the lower pressure prevails, and this cup preferably has a lateral surface which is of substantially cone frustum shape and a maximum diameter commensurate with the clearance required to enable the cup connected to the rod to oscillate within the cylinder.

In this way, the piston assembly is rigidly locked to the rod and able to oscillate with it, while the lipped seal ensures tightness regardless of the degree of inclination of the rod with respect to the cylinder axis. Thus the pressure exerted in a direction normal to the upper face of the piston is always parallel to the axis of the rod, so that there is no sideways-acting mechanical force exerted against the cylinder.

The description which follows with reference to the accompanying drawings, given by way of example only, will give a clear understanding of the various particularities of my invention and of the art of execution thereof.

In the drawings,

FIGURE 1 is an axial section of part of a cylinder within which slides a piston in accordance with the invention, the piston in this figure being shown with its rod parallel to the cylinder axis.

FIGURE 2 is a similar section to FIGURE 1, the piston and the rod being in this case shown inclined with respect to the cylinder axis.

FIGURE 3 is a schematic diagram of part of a suspension unit associated to a wheel-carrying half-axle.

Referring now to FIGURE 3, there is schematically illustrated thereon a vehicle oleo-pneumatic suspension unit chiefly comprising a cylinder 1 rigidly locked to the vehicle chassis and in which slides a piston 2 whose rod 3 is hinged at 4 onto a half-axle 5 swinging about a pin 6 and carrying one of the wheels of the vehicle. A suitable deformable sealing device such as, e.g., a diaphragm 1a of elastic material having an opening 1b through which the piston rod may slide, may advantageously be fixedly disposed in the lower part of the cylinder to prevent ingress of deleterious matter into the cylinder.

Thus, as the half-axle oscillates relative to the chassis, the piston slides in the cylinder and its rod 3 oscillates relative to the cylinder axis.

FIGURE 1 shows a piston in accordance with the invention which permits oscillation of the rod.

The end of piston-rod 3 is provided with two successive shoulders of decreasing diameter 7 and 8 and terminates in a threaded tip 9. A metal washer 10 whose diameter is distinctly less than that of the bore of cylinder 1 has a central bore enabling it to be threaded onto rod 3 yet causing it to abut against shoulder 7. A cup-shaped piece 11, which is likewise provided with a central bore, is threaded onto the rod and abuts against washer 10. The bottom 12 of the cup in contact with washer 10 embodies a groove 13 which surrounds the piston-rod and permits a sealing washer 14 to be accommodated in it. This sealing washer 14 has an inner diameter less than that of the reduced part of the rod, an outer diameter slightly in excess of that of groove 13 and a thickness slightly greater than the depth of groove 13, whereby tightening up of the assembly ensures effective sealing between the pieces 10 and 12 and the rod 3.

The outer bottom 12 of the cup has a diameter very substantially less than the diameter of the cylinder bore. The peripheral edge of the cup is raised and presents a lateral surface 15 of small height in the form of a cylindrical section co-axial with the rod 3. This surface 15 is joined to the cup bottom 12 via a conical frustum surface 16 of revolution about the axis of the rod.

A thick sealing washer 17 made of elastic material and whose relaxed diameter is greater than the cylinder bore diameter is provided with a central bore and is threaded onto rod 3. It is applied against the inner bottom of cup 11 and against the inner face 18 of the raised edge of said cup and also against the cylinder wall, so as to constitute a seal with a lip 19 directed towards the top of the cylinder. The face of the cup adjacent to washer 17 is provided with a circular bead 22 of triangular cross-section which bites into said sealing washer 17 to ensure tightness. Washer 17 is tightened by means of a circular piece 20 threaded over the rod and bearing against the shoulder 8 thereof. A nut 21 screwed onto the rod's threaded tip 9 locks the piece 20 into position.

As the half-axle oscillates relative to the chassis, the piston-rod 3 oscillates relative to the cylinder axis and, with it, the complete assembly carried by the rod, as shown in FIGURE 2. The lip of washer 17 applied against the cylinder bore is deformed and ensures tightness between the capacity or chamber 23 located above the piston and the capacity or chamber 24 located beneath it, on the same side as the rod. Evidently, the inclination of the cup's cone frustum surface 16 will suffice to permit such oscillation to either side of the cylinder axis.

The pressure prevailing in capacity 23 is generally distinctly greater than that prevailing in capacity 24. In order therefore to prevent the washer material from being thrust back as the result of his pressure differential, the cylindrical cup section 15 is given the maximum possible diameter compatible with piston oscillation.

By way of example, the following numerical values may be adopted: for a cylinder with a bore of 50 mm. and for a height of 0.5 mm. for the cylindrical surface 15 of cup 11, a diametrical clearance of 0.2 mm. may be adopted for said cup, this being adequate to permit oscillation of the cup without danger of seizure. In fact, the height of the cylindrical surface 15 can be as great as about 2 mm., and its external diameter such as to leave a diametrical clearance of only 0.1 mm., without any possibility of the piston binding against the cylinder. Trigonometrically it can be shown that when the cylindrical surface 15 of the cup 11 is 2 mm. high and has an outer diameter of 49.9 mm., the maximum apparent diameter of the cup is about 49.95 mm. The term "apparent diameter" is defined as the diametral dimension of the cup portion 15 measured as the normal distance from the top edge of the said portion at one side of the cup to the bottom edge of the said portion at the opposite side of the cup. Since the angle between this apparent diameter and the true diameter of the cup portion 15 is about 2°18′, no binding can occur during the minimum range of piston tilting from 0° to 2°18′. During any subsequent tilting of the piston, up to about 10° which is the maximum permissible in practice, the apparent diameter involved is much smaller, down to about 49.2 mm., so that binding is still impossible. It will be understood that actually the tilting of the piston past the minimum range is permitted only by virtue of the presence of the frusto-conical cup portion 16 which then provides the necessary clearance. In no case, of course, is it ever possible for the lip 19 of the washer 17 to be pushed down past the cup 11.

To summarize, tightness between the capacity 23 at high pressure and the capacity 24 at atmospheric pressure is ensured (a) along the length of the wall of cylinder 1, by the lipped part 19 of washer 17;
(b) over the upper face of cup 11, by the bead 22 biting into the rubber;
(c) over the bottom face of cup 11, by the compression sustained on all its faces by the washer 14 in its housing; and
(d) along the rod 3, by the pressure of washer 14 over the reduced section of the rod.

It may be noted that the piston in accordance with my invention offers an advantage over conventional pistons. In arrangements resorted to hitherto, the piston-rod is hinged onto the piston, the axis of the latter remaining parallel to the cylinder axis; in consequence, when the rod is inclined relative to the cylinder axis, the pressure exerted in a direction normal to the upper face of the piston gives rise to a couple producing a sideways-acting mechanical force which accentuates piston wear.

With the piston in accordance with the invention, the pressure which is always exerted normally to the upper face of the piston is in all cases parallel to the rod, so that the only lateral forces are those arising from the fluid's asymmetrically exerted thrust against the wall of the cylinder bore.

It is to be clearly understood that many modifications can be made to the embodiment described hereinabove without departing from the scope of the invention. Thus the cup-shaped piece 11 may be made of metal or plastic, the sealing washer 14 being dispensed with in the latter case.

What is claimed is:
1. An oleo-pneumatic suspension for connecting a chassis portion of a vehicle to a rigid wheel axle which is mounted for pivotal movement relative to said chassis portion, said suspension comprising a cylinder rigidly fixed to said chassis portion and having its axis oriented angularly relative to said axle and in an approximately vertical plane, a piston tiltably slidable in said cylinder and defining therein a chamber occupied by a fluid at a substantial pressure, and a piston rod rigidly connected at one end thereof to said piston and extending from the latter through and out of said cylinder, the other end of said piston rod being articulated to said axle at an intermediate point of the latter, said piston comprising a cup-shaped supporting member rigidly carried by said piston rod and having a shallow flat-bottomed recess bounded by a relatively steep upwardly sloping peripheral wall of substantial thickness, the outer diameter of said supporting member at the uppermost edge of said peripheral wall being slightly less than the inner diameter of said cylinder so as to have a clearance therebetween which is just adequate to prevent said wall from rubbing against said inner surface of said cylinder as said piston tilts to a substantial extent in said cylinder, an annular elastic washer positioned atop said supporting member, said washer when in its relaxed state being flat and having an outer diameter which is substantially greater than said inner diameter of said cylinder, and means connected with said piston rod for pressing said elastic washer against the bottom of said shallow recess of said supporting member and the inner surface of said sloping peripheral wall thereof to force said elastic washer to assume the shape of a cup having an annular lip directed toward said chamber and in sealing engagement with said inner surface of said cylinder, whereby said piston may tilt in said cylinder when said piston rod is angularly displaced due to pivotal movements of said axle while the vehicle is in motion.

2. A suspension according to claim 1, said peripheral wall of said supporting member having an outer face presenting an upper cylindrical portion coaxial with said piston rod and a lower frusto-conical portion tapering from said cylindrical portion, the height of said cylindrical face portion being predetermined to provide the desired clearance between said peripheral wall and said inner surface of said cylinder over a minimum range of tilting of said piston, and the taper of said frusto-conical face portion being predetermined to provide clearance between said supporting member and said inner surface of said cylinder at any tilt of said piston greater than said minimum range.

3. A suspension according to claim 1, said piston rod being provided with a pair of annular shoulders spaced from one another axially of said piston rod with the narrower shoulder being disposed closer to said one end of said piston rod, said piston further comprising a rigid washer abutting against the wider shoulder of said piston rod, said supporting member being seated on said rigid washer and having a central bore accommodating said piston rod, said bore being widened at the bottom of said supporting member to define an annular groove, and a packing element disposed in said groove in sealing relation with said piston rod and said rigid washer, said supporting member being further provided with a circular bead projecting upwardly from the flat bottom of said recess, and said pressing means comprising an annular pressing member seated against said narrower shoulder of said piston rod and engaging the upper surface of said elastic washer to conform the latter to the shape of said recess, whereby said bead bites into the lower surface of said elastic washer to form a seal and a portion of said elastic washer is forced by said pressing member against said sloping peripheral wall, and means secured to said piston rod for tightening said pressing member against said narrower shoulder of said piston rod.

References Cited in the file of this patent
UNITED STATES PATENTS 2,388,520    Bowie   Nov. 6, 1945

FOREIGN PATENTS 571,547    France   Feb. 4, 1924
1,215,183    France   Nov. 16, 1959